March 3, 1970  A. A. GOUGH  3,498,457
ELECTRONIC WATER PURIFIER
Filed Oct. 9, 1967  5 Sheets-Sheet 1
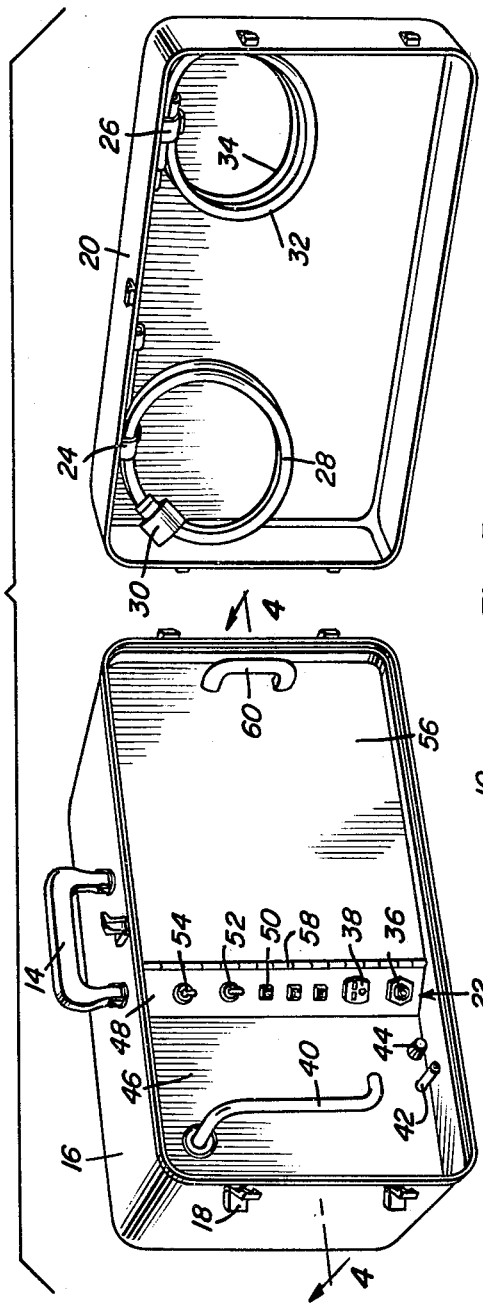
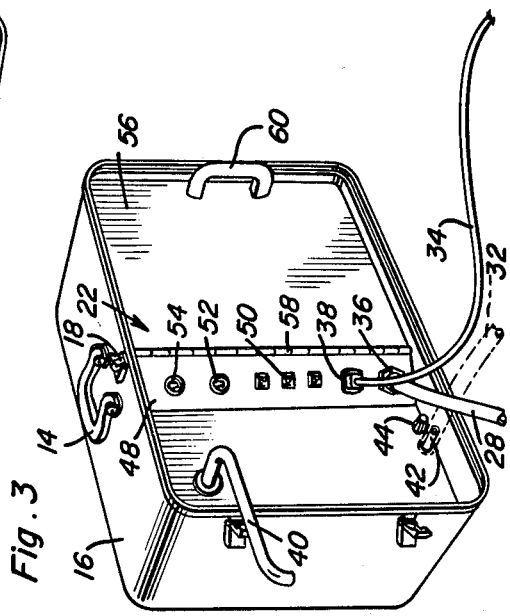
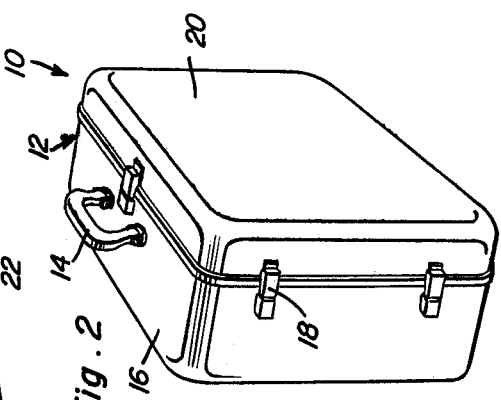
Alfredo A. Gough
INVENTOR.

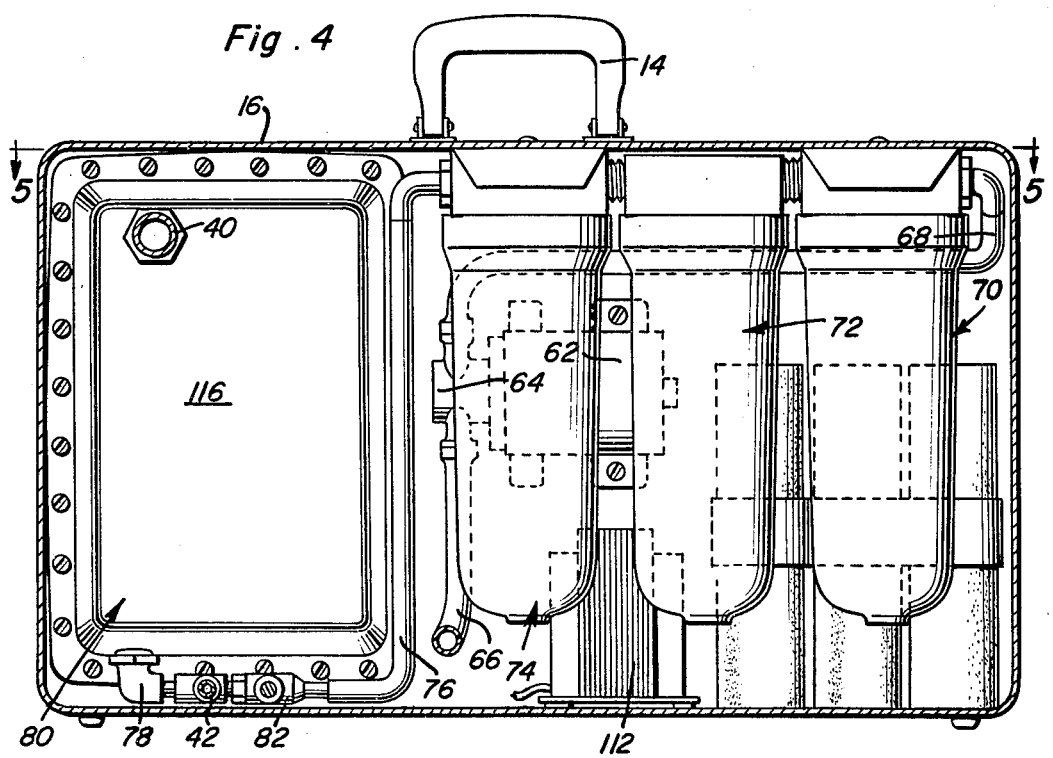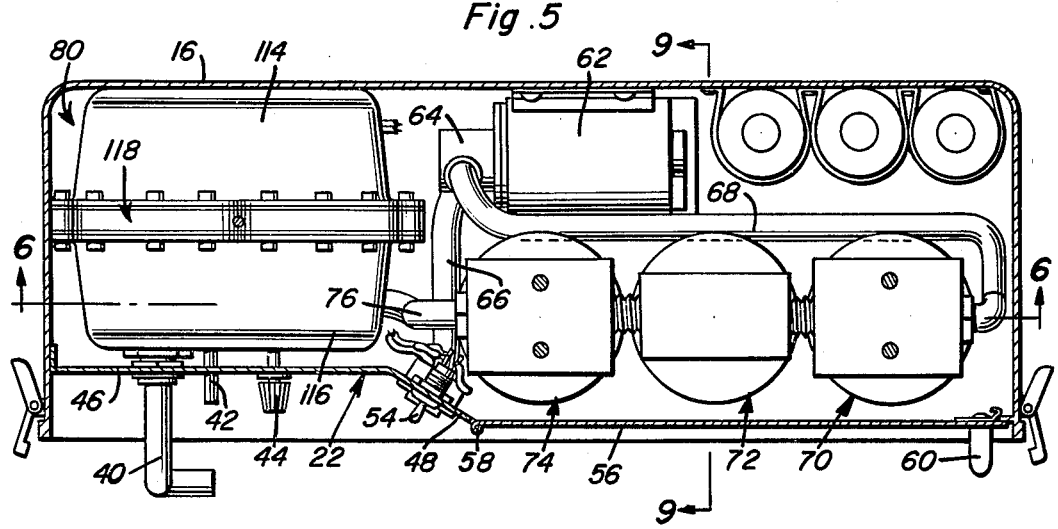

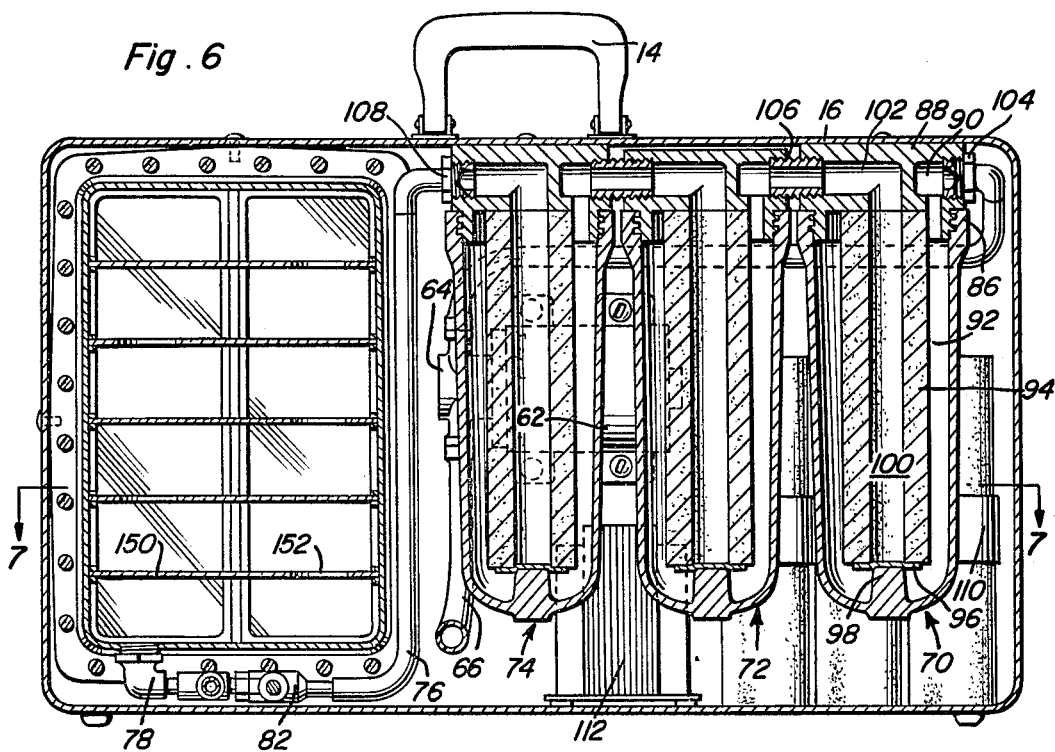
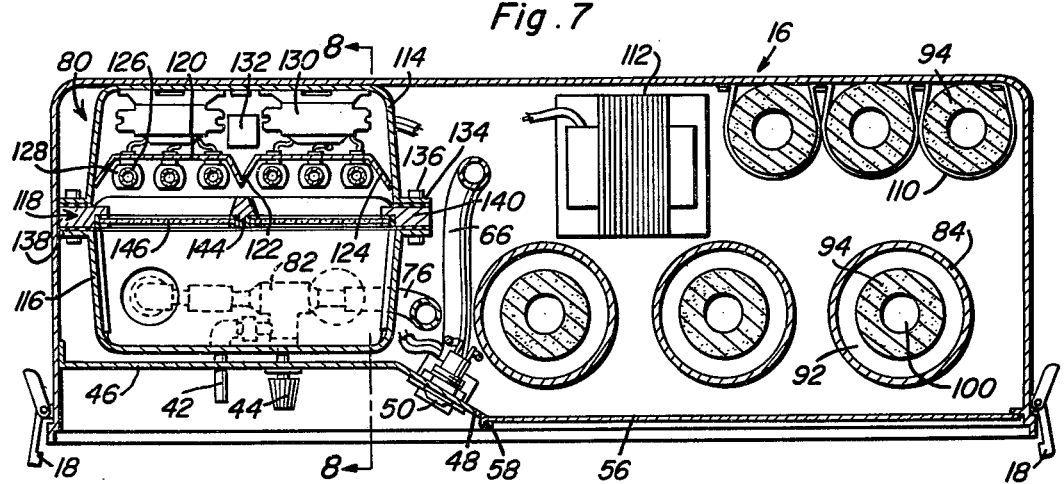

Alfredo A. Gough
INVENTOR.

March 3, 1970  A. A. GOUGH  3,498,457
ELECTRONIC WATER PURIFIER
Filed Oct. 9, 1967  5 Sheets-Sheet 5

Alfredo A. Gough
INVENTOR.

BY Clarence A. O'Brien
and Harvey B. Jacobson
Attorneys

United States Patent Office 3,498,457
Patented Mar. 3, 1970

3,498,457
ELECTRONIC WATER PURIFIER
Alfredo A. Gough, El Paso, Tex., assignor to Ruffin
Industries, Inc., a corporation of Texas
Filed Oct. 9, 1967, Ser. No. 673,910
Int. Cl. C02b 3/00
U.S. Cl. 210—85
21 Claims

ABSTRACT OF THE DISCLOSURE

A portable water purifier within which water is passed sequentially through filtering devices for removal of solid impurities and irradiated in a germicidal unit for rendering organic pollutants harmless. The filtering devices and the germicidal unit together with a motor operated pump and electrical power components are housed within a single case having a control panel mounting control switches, malfunction indicators, water and electrical connectors and a drain valve control for operating and servicing the purifier.

---

The present invention relates to water purifying apparatus and more particularly to a portable assembly for converting water obtained from natural resources into potable drinking water.

In order to utilize water obtained from natural sources, such as rivers, lakes, streams, swamps, etc., for drinking purposes, the water must undergo treatment for removal of solid impurities and pollutants. The methods and apparatus for accomplishing these ends are well-known and include filtering devices and germicidal sterilizer units. Generally, the apparatus necessary to sufficiently treat water from possibly polluted sources, is quite cumbersome, bulky and heavy. Furthermore, the assemblage of equipment and apparatus is often time consuming for installation at some desired location while servicing and maintenance of the equipment also presents a problem. A need therefore arises for a self-contained water purifying assembly by means of which potable and palatable water safe for human consumption may be rapidly and efficiently obtained from available natural sources as aforementioned which may be polluted.

In accordance with the present invention, water purifying apparatus capable of sufficiently treating non-potable water from natural sources is made available in a portable assembly. Thus, the apparatus is enclosed within a single carrying case opened by removal of a case cover to expose a control panel behind which the apparatus is housed. Water is conducted into the apparatus through the control panel for sequential passage through a plurality of filters before it is conducted along a baffled flow path through a germicidal irradiation unit. The apparatus is connected to a source of electrical energy for operating a motor pump causing flow of water through the apparatus and the radiation lamps associated with the germicidal unit. Potable water is accordingly discharged from the apparatus by means of a swing-out spout pivotally mounted on the control panel behind which the germicidal unit is enclosed. The panel also mounts control switches and malfunction indicators as well as draining facilities to operate and service the apparatus.

These together with other objects and advantages which will become subsequently apparent reside in the details of the construction and operation as more fully hereinafter described and claimed, reference being had to the accompanying drawings forming a part hereof, wherein like numerals refer to like parts throughout, and in which:

FIGURE 1 is a perspective view of the water purifier assembly of the present invention showing the case cover removed.

FIGURE 2 is a perspective view of the water purifier assembly in a transport condition.

FIGURE 3 is a perspective view of the water purifier assembly in use.

FIGURE 4 is a front sectional view taken substantially through a plane indicated by section line 4—4 in FIGURE 1.

FIGURE 5 is a top sectional view taken substantially through a plane indicated by section line 5—5 in FIGURE 4.

FIGURE 6 is a sectional view taken substantially through a plane indicated by section line 6—6 in FIGURE 5.

FIGURE 7 is a sectional view taken substantially through a plane indicated by section line 7—7 in FIGURE 6.

Figure 8:
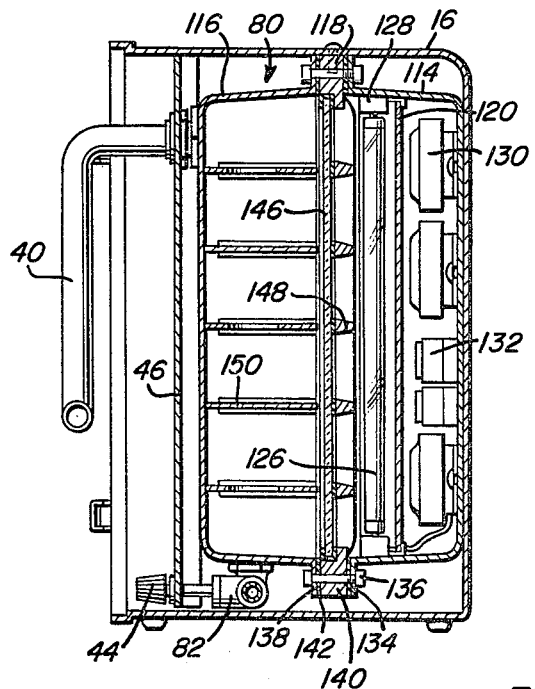
FIGURE 8 is a transverse sectional view taken substantially through a plane indicated by section line 8—8 in FIGURE 7.
Figure 9:
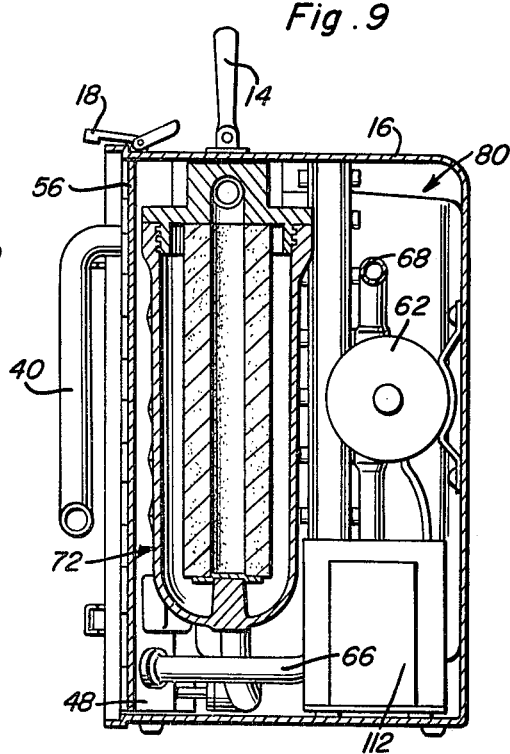
FIGURE 9 is a transverse sectional view taken substantially through a plane indicated by section line 9—9 in FIGURE 5.

Referring now to the drawings in detail, the water purifier device generally referred to by reference numeral 10 is shown in a transport condition in FIGURE 2. It will be noted therefore, that the device is enclosed within a carrying case 12 having a handle 14 pivotally connected to the top of the case back or housing 16 which is provided with a plurality of latches 18 on the sides and top for releasably holding the case cover 20 on the housing. As shown in FIGURE 1, when the case cover 20 is removed from the housing 16, a control panel 22 is exposed in the opening of the housing 16 behind which the various components of the water purifier are located. The case cover on the other hand is provided with holding clips 24 and 26 for storing a pick-up hose 28 having a filter strainer 30 at one end thereof, a drain hose 32 and an electrical power cord 34. Water from a natural source is brought to the purifier through the pick-up hose 28 inserted into an inlet connector 36 mounted on the control panel as shown in FIGURE 2. Electrical energy for operating the purifier is supplied from a suitable source of electrical energy such as a gasoline engine operated generator through the electric cord 34 plugged into an electrical connector receptacle 38 also mounted on the control panel just above the inlet hose connector 36. Thus, the water purifier in use as shown in FIGURE 3 will discharge potable water from an outlet spout 40 pivotally mounted on the control panel so that it may be swung from the storage position shown in FIGURE 1 to the dispensing position shown in FIGURE 3. Also, extending from the control panel within the housing 16, is a drain outlet 42 to which the drain hose 32 may be connected for draining water from the purifier upon opening of a drain valve by means of the drain valve control 44.

The control panel 22 includes a section 46 fixed to the housing 16 inwardly spaced from its opening through which the water conducting conduits extend including the outlet spout 40 pivotally mounted thereon, the drain outlet 42 and the inlet hose connector 36. The drain valve control 44 also extends through the fixed panel section 46 adjacent to the drain outlet 42. The fixed panel section includes an intermediate portion 48 on which the inlet hose connector 36 and the electrical connector receptacle 38 are mounted below a plurality of malfunction indicating lamps 50. The intermediate portion of the fixed panel section also mounts a pump motor switch 52 and a purifier lamp switch 54 for controlling operation of the water purifier as will be hereafter explained. The control panel is also provided with a movable section 56 connected to the intermediate portion 48 of the fixed panel section by the hinge assembly 58. A handle 60 is connected to the movable panel section adjacent an end opposite the hinge assembly 58 so that the movable panel section may be pivotally opened to expose the apparatus behind the panel for repair, servicing and maintenance purposes. The carrying case 12 and the control panel 22 are of course made of a suitable material for protectively enclosing the operating components of the water purifier and supporting such components in operative relation to each other.

Referring now to FIGURES 4 and 5, it will be noted that a pump motor 62 is secured to the back wall of the housing 16 and supports on the left side thereof, a self-priming pump 64. The pump is connected to the inlet hose connector 36 by an intake conduit 66 while the discharge side of the pump is connected by the discharge conduit 68 to the inlet side of the filter device 70 suspended from the top wall of the housing 16. The filter device 70 is connected in series with the filter devices 72 and 74 for sequential passage of water through the filter devices 70, 72 and 74. The outlet side of the filter device 74 is connected by the conduit 76 to an inlet elbow fitting 78 of a germicidal sterilizing unit 80 secured to the back wall and top wall of the housing 16 behind the fixed panel section 46. A drain valve 82 is connected in the line between the conduit 76 and the inlet elbow fitting 78 to conduct filtered water from the filter device 74 to the inlet of the sterilizing unit 80 when the drain valve is closed. Upon opening of the drain valve by means of the drain control 44, water will drain from both the germicidal sterilizing unit and the filtering devices through the drain outlet 42 as aforementioned.

Each of the filtering devices 70, 72 and 74 are similar in construction. As more clearly seen in FIGURES 6 and 7, each filtering device includes a vertically elongated filter housing 84 having an internally threaded upper portion 86 which is threadedly mounted on a flow passage block 88 adapted to be secured to the top of the housing 16 for suspending the filtering device therefrom. The flow passage block includes an inlet passage 90 which is in fluid communication with the annular flow space 92 surrounding a tubular filter cartridge 94 held assembled within the housing 84 between the block 88 and the plate 96 which in turn is supported on the rest 98 formed in the housing 84. The filter cartridge 94 accordingly forms a central passage 100 from which filtered water passes into the outlet passage 102 formed in the block 88. Thus, water supplied to the filter device 70 will enter its inlet passage 90 through the fitting 104 interconnecting the pump discharge conduit 68 with the block 88. Relatively large solid impurities may accordingly be filtered out of the water as it passes through the filter cartridge of 5 micron porosity for example associated with the filtering device 70. The filtered water is conducted from the outlet passage 102 in the filtering device 70 through a coupling fitting 106 to the inlet passage associated with the filtering device 72 which may be provided with a 1 micron porosity filter cartridge for filtering out smaller solid impurities. The outlet passage of the filter device 72 is connected by another coupling fitting to the inlet passage associated with the filter device 74 provided with a filter cartridge containing activated charcoal and/or carbon crystals for removal of objectionable taste and odor factors. The outlet passage of the filtering device 74 is then connected by the fitting 108 to the sterilizing unit 80 through the conduit 76 as aforementioned. Spare filter cartridges for the filtering devices may be stored within the housing on the back wall thereof by means of holding bands 110.

Flow of water through the filtering devices and the sterilizing unit is induced by the pump 64 as aforementioned upon energization of the pump motor 62. Electrical energy supplied to the water purifier through the electric cord 34 is converted into proper form for operation of the motor upon closing of the pump switch 52 by means of a transformer 112 electrically connected to the power connector 38 and to the motor 62 through motor switch 52. The transformer is mounted on the bottom of the case 16 behind the filtering devices 72 and 74. The output of the transformer also supplies electrical energy to the sterilizing unit 80 under control of the switch 54. The electrical components associated with the sterilizing unit 80 are housed within a lamp assembly housing 114 secured to the back wall of the housing 16. The filtered water which passes through the sterilizing unit on the other hand, is conducted through a water jacket 116 secured to the lamp assembly housing 114 by means of a lens assembly 118 which also forms a water-tight closure for the water jacket. The inlet fitting 78 is connected to the bottom of the water jacket 116 while the outlet spout 40 is connected to the water jacket adjacent its upper end as more clearly seen in FIGURE 4.

Referring now to FIGURES 6, 7, 8 and 11, it will be observed that the lamp assembly housing 114 fixedly mounts therein a pair of reflector panels 120 interconnected by a reflective partition 122, the reflector panels also having side reflectors 124 to enclose two banks of three ultra-violet radiating lamp tubes 126 vertically mounted in parallel spaced relation to each other between upper and lower tube sockets 128 secured to the lamp assembly housing 114. Also, mounted on the lamp assembly housing rearwardly of the reflector panels 120, are six ballast devices 130 and six starter devices 132 wired to the lamp tube sockets 128 for proper operation of the lamps. The lamp housing is also provided with a peripheral flange 134 connected by a plurality of fastener assemblies 136 to the lens assembly 118 and the flange 38 of the water jacket 116.

The lens assembly includes a peripheral frame 140 sandwiched between sealing gaskets 142 placed on the inside of the flanges 134 and 138 respectively associated with the lamp assembly housing 114 and the water jacket 116. A vertical partition element 144 interconnects the horizontal portions of the frame 140. The vertical partition 144 is recessed on opposite vertical sides thereof while the peripheral frame 140 is recessed on the inside thereof to form a seat for two glass lens elements 146 through which ultra-violet radiation is transmitted from the lamp tubes 126 into the water jacket for irradiating the water passing therethrough. In order to sustain the high water pressure that exists within the water jacket, the glass lens elements are backed by a plurality of backing frame elements 148 that are connected to the peripheral frame 140 and extend horizontally between the vertical portions thereof.

The backing elements 148 are aligned with a plurality of vertically spaced baffle plates 150 mounted within the water jacket 116. The vertical sides of the water jacket are accordingly provided with slide brackets 152 for slidably receiving the baffle plates 150. The baffle plates are provided with openings 154 adjacent opposite ends thereof so that water under pressure entering the bottom of the water jacket on one side must flow horizontally across the jacket to the opening 154 and then flow in a reverse direction transversely across the water jacket. Thus, the water flows through a circuitous path established by the baffle plates 150 from the inlet at the lower end to the outlet 40 at the upper end of the water jacket. Also, as the water flows through the water jacket, it is in continuous contact with the lens elements 146 through which ultra-violet radiations are transmitted for irradiating the water. In view of the prolonged circuitous path taken by the water through the water jacket, the direct and reflected radiation emitted from the lamp tubes 126 and the concentration of such radiation energy within the water jacket by the lens elements, organic pollutants within the water will be rendered harmless to the extent necessary.

Figure 10:
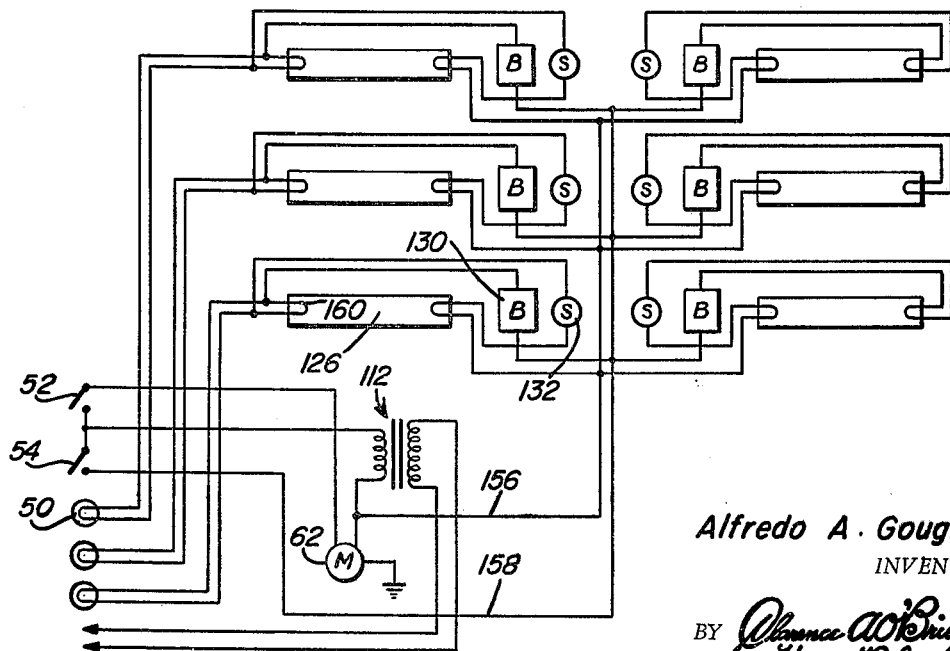
FIGURE 10 is an electrical circuit diagram associated with the germicidal sterilizing unit associated with the water purifier.
Figure 11:
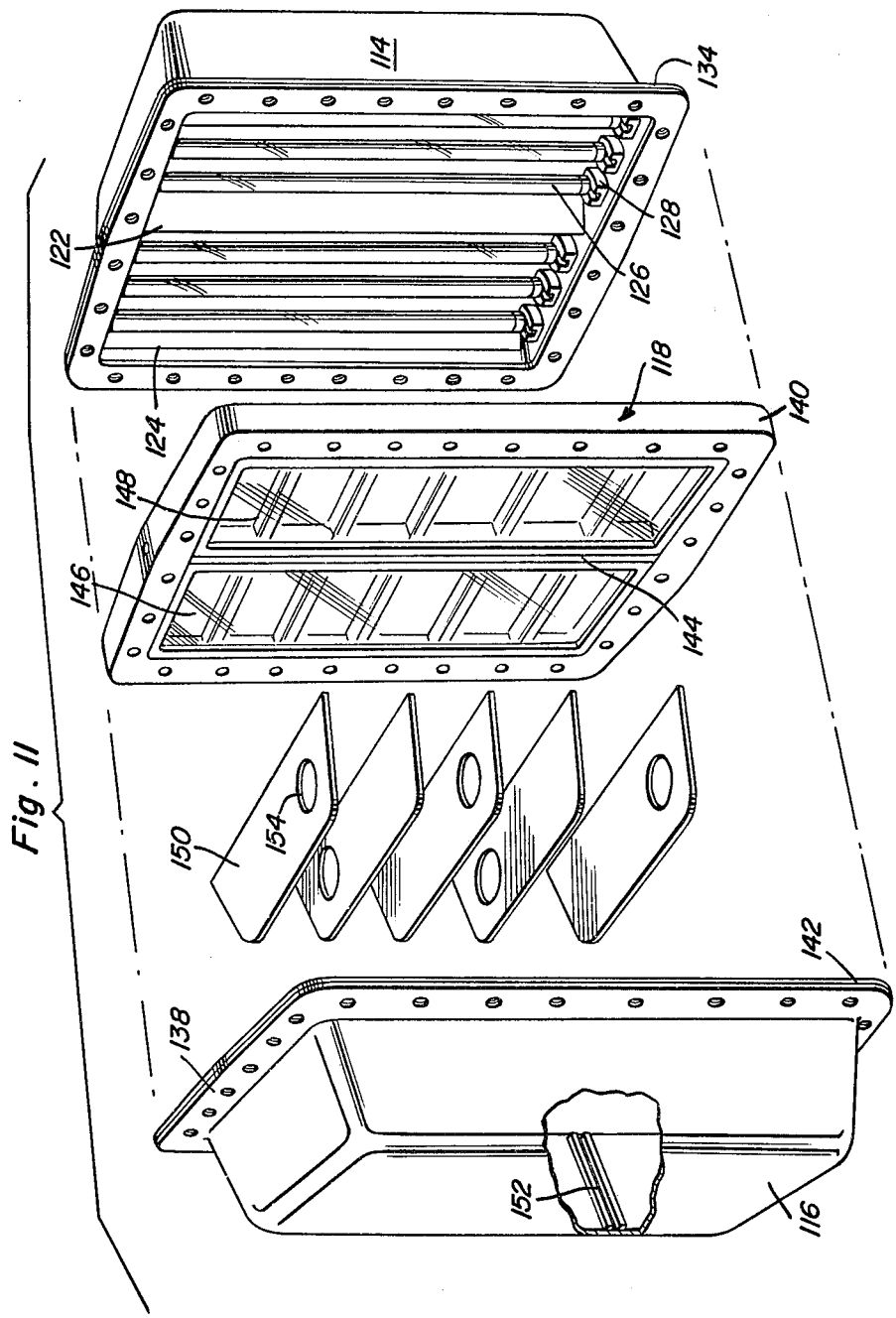
FIGURE 11 is a perspective view showing the disassembled components of the germicidal sterilizing unit.

As shown in FIGURE 10, the primary of the transformer 112 is conected to the source of AC voltage obtained from the electrical power supply through the electric cord 34 for energizing the pump motor 62 upon closing of the motor switch 52 thereby connecting the motor across the secondary winding. The lamp circuits are connected in parallel with the pump motor across the secondary winding of transformer 112 by supply lines 156 and 158 in series with the switch 54. It will be apparent therefore, that the lamp circuits cannot be energized by closing of the switch 54 until the pump motor is energized upon closing of the motor switch 52. Each pair of lamps 126 is associated with one of the malfunction indicating lamps 50 connected across one of the lamp filaments in parallel with the ballast and starter devices 130 and 132. Accordingly, when the lamps are turned on, the malfunction indicators 50 will initially flicker. When the lamp tubes are fully ignited, the malfunction indicator lamps 50 will be extinguished. Should one of the lamps fail to operate or stop operating, the associated indicator 50 will become illuminated to not only indicate malfunction but partially locate the malfunction. Servicing and repair of the sterilizing units are thereby facilitated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. In a portable device for treating water, an enclosure having a housing formed with an opening and a panel closing the opening, said panel having a stationary section and a movable section spaced therefrom, a water sterilizing unit mounted within the housing behind the stationary panel section, water conducting means connected to the sterilizing unit and extending through said stationary panel section, filtering means connected to the sterilizing unit and the water conducting means and disposed within the housing behind the movable panel section and means hingedly interconnecting the panel sections for selectively exposing the filtering means within the housing.

2. The combination of claim 1 including control devices mounted on the stationary section of the panel and connected to the sterilizing unit and the filtering means for operation thereof, and malfunction indicating means mounted on the stationary panel section and connected to the sterilizing unit.

3. The combination of claim 2 wherein said water conducting means includes an outlet spout pivotally mounted on the stationary panel section and connected to the sterilizing unit, an inlet hose connector mounted on the stationary panel section and connected to the filtering means, and controllable drain means connected between the sterilizing unit and the filtering means for draining water therefrom.

4. The combination of claim 3 wherein said sterilizing unit comprises a germicidal lamp asembly, a water jacket connected to the filtering means and the water conducting means, a lens assembly mounting the water jacket on the lamp assembly and transmitting sterilizing radiation from the lamp assembly into the water jacket, and baffle means mounted within the water jacket for establishing a circuitous flow of water in contact with the lens assembly between the drain means and the outlet spout.

5. The combination of claim 4 wherein said lens assembly includes a frame interconnected with the lamp assembly and the water jacket, a lens element mounted in the frame, and a plurality of backing elements connected to the frame abutting the lens elements in alignment with the baffle means.

6. The combination of claim 5 wherein the lamp assembly includes reflector means mounted in spaced relation to the lens assembly, a plurality of radiation emitting lamp tubes mounted between the reflector means and the lens assembly perpendicular to the backing elements and the baffle means, and electrical power supply means connected to the lamp tubes through one of said control devices.

7. The combination of claim 6 wherein said power supply means includes a transformer mounted behind the movable panel section and a power connector mounted on the stationary panel section connected to the transformer.

8. The combination of claim 7 wherein said filtering means comprises a plurality of series connected filter devices and pump means connecting the inlet hose connector of the water conducting means to the filter devices for sequential passage of water through the filter devices and the water jacket of the sterilizing unit.

9. The combination of claim 8 wherein said pump means includes a pump motor connected to the transformer through another of the control devices.

10. The combination of claim 1 wherein said water conducting means includes an outlet spout pivotally mounted on the stationary panel section and connected to the sterilizing unit, an inlet hose connector mounted on the stationary panel section and connected to the filtering means, and controllable drain means connected between the sterilizing unit and the filtering means for draining water therefrom.

11. The combination of claim 10 wherein said filtering means comprises a plurality of series connected filter devices and pump means connecting the inlet hose connector of the water conducting means to the filter devices for sequential passage of water through the filter devices and the sterilizing unit.

12. The combination of claim 1 wherein said sterilizing unit comprises a germicidal lamp assembly, a water jacket connected to the filtering means and the water conducting means, a lens assembly mounting the water jacket on the lamp assembly and transmitting sterilizing radiation from the lamp assembly into the water jacket, and baffle means mounted within the water jacket for establishing a circuitous flow of water in contact with the lens assembly between the drain means and the outlet spout.

13. The combination of claim 12 wherein said lens assembly includes a frame interconnected with the lamp assembly and the water jacket, a lens element mounted in the frame, and a plurality of backing elements connected to the frame abutting the lens elements in alignment with the baffle means.

14. The combination of claim 13 wherein the lamp assembly includes reflector means mounted in spaced relation to the lens assembly, a plurality of radiation emitting lamp tubes mounted between the reflector means and the lens assembly perpendicular to the backing elements.

15. The combination of claim 14 including control devices mounted on the stationary section of the panel and connected to the lamp assembly and the filtering means for operation thereof, and malfunction indicating means mounted on the stationary panel section and connected to the lamp assembly.

16. A sterilizing unit comprising a germicidal lamp assembly, a water jacket, a lens assembly mounting the water jacket on the lamp assembly and establishing a planar closure for the water jacket through which sterilizing radiation from the lamp assembly is transmitted into the water jacket, and baffle means mounted within the water jacket for establishing a circuitous flow of water said lens assembly including a frame interconnected with the lamp assembly and the water jacket, a lens element mounted in the frame in contact with the baffle means and a plurality of backing elements connected to the frame abutting the lens element in alignment with the baffle means.

17. The combination of claim 16 wherein the lamp assembly includes reflector means mounted in spaced relation to the lens assembly, a plurality of radiation emitting lamp tubes mounted between the reflector means and the lens assembly perpendicular to the backing elements.

18. A device for treating water comprising filtering means sequentially removing solid impurities from water passing therethrough, germicidal means connected to the filtering means for irradiating the filtered water, a housing enclosing the filtering means and the germicidal means, pump means mounted within the housing for inducing flow of the water through the filtering means and the germicidal means and malfunction indicating means mounted by the housing and connected to the germicidal means.

19. The combination of claim 18 including a control panel fixedly mounted in the housing on which the malfunction indicating means is mounted and water conducting means extending through the control panel for supplying water to the filtering means and dispensing potable water from the germicidal means when the pump means is operating.

20. The combination of claim 19 wherein said control panel includes a movable portion through which the filtering means is exposed for maintenance purposes.

21. The combination of claim 16 wherein said baffle means comprises a plurality of spaced plates partitioning the water jacket perpendicular to the lens element, said plates having staggered openings therein to establish a flow path through the water jacket for said circuitous flow of water.

References Cited

UNITED STATES PATENTS

| | | | |
|---|---|---|---|
| 2,572,971 | 10/1951 | Bauer | 210—85 |
| 2,669,661 | 2/1954 | Riddiford et al. | 250—43 |
| 2,844,727 | 7/1958 | Maciszewski et al. | 21—102 X |
| 3,071,828 | 1/1963 | Cornell | 21—102 X |
| 3,342,335 | 9/1967 | Gamundi et al. | 210—244 X |
| 3,366,441 | 1/1968 | Ellner et al. | 21—102 X |

REUBEN FRIEDMAN, Primary Examiner

JOHN W. ADEE, Assistant Examiner

U.S. Cl. X.R.

21—54, 102; 210—152, 244, 258, 260